(12) United States Patent
Andreev et al.

(10) Patent No.: US 11,244,124 B2
(45) Date of Patent: Feb. 8, 2022

(54) COLLABORATIVE TRANSLATION SYSTEMS WITH MULTIPLE ACCOUNT TYPES AND PROFILE TYPES

(71) Applicant: SMARTCAT LLC, Kazan (RU)

(72) Inventors: Sergey Andreev, Kazan (RU); Irina Petrenko, Kazan (RU); Artem Ukrainets, Moscow (RU); Ivan Smolnikov, Moscow (RU)

(73) Assignee: Smartcat LLC, Kazan (RU)

( * ) Notice: Subject to any disclaimer, the term of this patent is extended or adjusted under 35 U.S.C. 154(b) by 0 days.

(21) Appl. No.: 16/620,450

(22) PCT Filed: May 8, 2018

(86) PCT No.: PCT/IB2018/000587
§ 371 (c)(1),
(2) Date: Dec. 6, 2019

(87) PCT Pub. No.: WO2019/215467
PCT Pub. Date: Nov. 14, 2019

(65) Prior Publication Data
US 2021/0089725 A1    Mar. 25, 2021

(51) Int. Cl.
*G06F 40/58* (2020.01)
(52) U.S. Cl.
CPC .................... *G06F 40/58* (2020.01)
(58) Field of Classification Search
CPC .............................. G06F 40/58; G06F 40/40
USPC ............................................................ 704/2
See application file for complete search history.

(56) References Cited

U.S. PATENT DOCUMENTS

2014/0142918 A1  5/2014  Dotterer et al.
2014/0181208 A1  6/2014  Robinson et al.

OTHER PUBLICATIONS

International Search Report and Written Opinion for International Application No. PCT/IB2018/000587, dated May 8, 2018, 7 pages.

*Primary Examiner* — Thierry L Pham
(74) *Attorney, Agent, or Firm* — Lowenstein Sandler LLP

(57) ABSTRACT

The subject matter of this specification can be implemented in, among other things, a method that includes storing translator linguistic resources for a personal account and project linguistic resources for a corporate account. The method includes creating a private profile for the personal account in response to the personal account being added to a team for the corporate account or being assigned to a translation project for the corporate account. A graphical user interface provides access to the translator linguistic resources within the translation project for the private profile without providing access to the translator linguistic resources within the translation project for the corporate account. The graphical user interface provides translation suggestions from the project linguistic resources within the translation project for the private profile without providing full access to the project linguistic resources within the translation project for the private profile.

20 Claims, 8 Drawing Sheets

252 — Task: Translation > Project: Test Project A > Document: Test Document C https://www.collaborativetranslationsystem.com/translator/...

Segments — 254

| | | | |
|---|---|---|---|
| 1 | The quick brown fox jumps over the lazy dog. | El rápido zorro marrón salta sobre el perro perezoso. | ✓ Done MT |
| 2 | The quick brown fox jumped over the lazy dog. | El rápido zorro marrón saltó sobre el perro perezoso. | ☑ Translation TM 91% |
| 3 | The quick red fox jumped over the lazy dog. | | ☐ Translation |

CAT — 256

| | | |
|---|---|---|
| lazy | TB | gandul |
| The quick brown fox jumps over the lazy dog. | TM 86% | El rápido zorro marrón salta sobre el perro perezoso. |
| The quick red fox jumps over the lazy dog. | MT | El rápido zorro rojo salta sobre el perro perezoso. |

CAT Info — 258

Translation memory match difference:

The quick brownred fox jumpsjumped over the lazy dog.

Translation memory: Test TM for Translator B

COLLABORATIVE TRANSLATION SYSTEMS WITH MULTIPLE ACCOUNT TYPES AND PROFILE TYPES

CROSS-REFERENCE TO RELATED APPLICATION

This patent application is a U.S. National Phase Application under 35 U.S.C. § 371 of International Application No. PCT/IB2018/000587, filed May 8, 2018, entitled COLLABORATIVE TRANSLATION SYSTEMS WITH MULTIPLE ACCOUNT TYPES AND PROFILE TYPES.

TECHNICAL FIELD

This instant specification relates to a collaborative translation system with multiple account types and multiple profile types.

BACKGROUND

Information gathering and exchange for any scientific, commercial, political or social purpose often requires fast and easy translation of content in order to make the universe of knowledge and ideas useful on a global scale. Computer programs that translate automatically from one language to another ("machine translation programs") can in principle meet this need and such programs have been developed and are in continued development for a variety of languages. For formal (as opposed to informal, idiomatic, colloquial) content in well-studied languages (e.g., English, French, Spanish, German, and others), such machine translation programs work reasonably well.

However, for more-difficult or less-studied languages (e.g., Arabic), existing machine translation programs do not work well, even for formal communications (e.g., Modem Standard Arabic), and they are particularly weak in the case of informal, colloquial, and idiomatic communications. Similarly, where specificity is needed, machine translation by itself is insufficient even for well-studied languages (e.g., English, French, Spanish, German, and others). Human translators can in principle provide accurate translations for difficult languages and informal communications, but Internet applications require constant availability and quick response, which cannot be assured in the case of existing methods that use human translators.

DESCRIPTION OF DRAWINGS

FIG. 2B shows an example of a translation graphical user interface for collaborative translation.

DETAILED DESCRIPTION

Figure 1A:
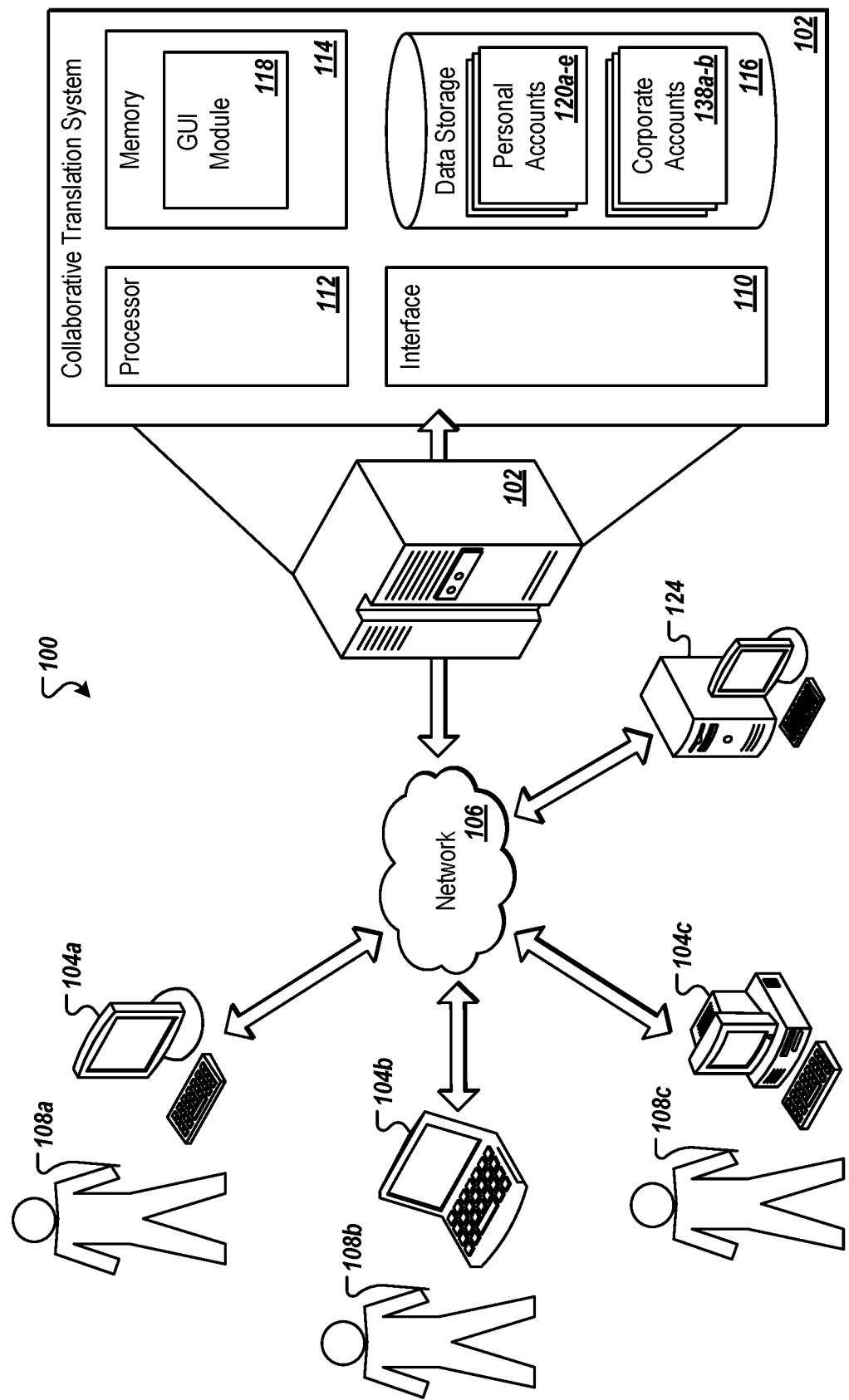
FIG. 1A is a schematic diagram that shows an example of a system for providing computer-aided or assisted translation using a collaborative translation system that has multiple account types and multiple profile types.

This document describes systems and techniques for providing a graphical user interface for collaborative translation. This may be achieved by one or more processors executing instructions stored in one or more memories for providing the graphical user interface to users at client computing devices for collaborative translation of text from at least one source language to at least one target language.

Existing computer-aided or assisted translation systems do not protect access to projects and linguistic resources based on multiple account types and/or profile types. Aspects of the present disclosure address the above and other deficiencies by providing a collaborative translation system that reduces the amount of manual labor to organize a multi-user and/or multi-company workflow for computer-aided or assisted translation. The collaborative translation system may automatically distribute access rights to projects and linguistic resources. This may protect access for multiple types of accounts. For example, freelance translators may need linguistic resources to be integrated into a graphical user interface of the collaborative translation system, but the freelance translators do not want access provided to the client that requests the translation, a vendor the manages the translation, or other translators. The collaborative translation system may use personal type accounts to allow a freelance translator to use the linguistic resources of the freelance translator with the graphical user interface of the collaborative translation system without providing access to the client, the vendor, or other translators. In another example, the client may need to provide the text for the project to translators or the vendor and may need to provide some level of access to linguistic resources for the project, but the client does not want to provide access to other project information, such as a list of translators for the project or full access to the linguistic resources. The collaborative translation system may use corporate type accounts to provide access to some project information (e.g., the text to be translated) for some types of accounts (e.g., vendor and translator accounts) and restrict access to other information (e.g., the list of translators). The collaborative translation system may also provide a particular level of access to linguistic resources based on the types of accounts, such as by allowing a corporate account for a vendor and/or a personal account for a translator to use project linguistic resources to suggest translations without providing full access to the project linguistic resources (e.g., downloading or directly accessing the contents of the linguistic resources).

A translator participating in a translation project through a graphical user interface of a collaborative translation system may wish to use linguistic resources that are specific to the translator. A client requesting a translation for a translation project (or a vendor providing the translation for the translation project of the client) may wish to provide linguistic resources for the translator. The collaborative translation system may integrate the linguistic resources of the translator and/or the client/vendor into the graphical user interface to reduce the amount of time the translator spends performing translations for the translation project and to increase the accuracy of the translations provided by the freelance translator.

The collaborative translation system may protect access to one or more translator linguistic resources. The translator linguistic resources may be associated with a first translator account within the collaborative translation system. The first translator account may be assigned to a first translation project within the collaborative translation system by a first corporate account for the first translation project. The collaborative translation system provides a graphical user interface that allows multiple translator accounts within the collaborative translation system, including the first translator account, to participate in translating text for the first translation project from at least one source language to at least one target language. The collaborative translation system provides the first translator account with access to the translator linguistic resources within the graphical user interface for the first translation project without providing access to others of the translator accounts (or the first corporate account) even though the other translator accounts and may also be assigned to participate in the first translation project.

The collaborative translation system may protect access to project linguistic resources within the first translation project. The collaborative translation system provides the first translator account and ones of the translation accounts that participate in the first translation project with access to the project linguistic resources within the graphical user interface for the first translation project without providing access to others of the translator accounts (or corporate accounts) assigned to others of the translation projects within the collaborative translation system.

The collaborative translation system may protect access to the translator linguistic resources within multiple translation projects. The first translator account may be assigned to a second translation project within the collaborative translation system by a second corporate account for the second translation project. The collaborative translation system provides the graphical user interface that allows ones of the translator accounts, including the first translator account, to participate in translating text for the second translation project from at least one source language to at least one target language. The collaborative translation system provides the first translator account with access to the translator linguistic resources within the graphical user interface for the second translation project without providing access to others of the translator accounts (or the second corporate account) even though the other translator accounts and may also be assigned to participate in the second translation project.

The translator and/or project linguistic resources may include, for example, a translation memory, a glossary, one or more regular expressions, or identification of one or more machine translation engines. The translator and/or project linguistic resources may reduce the amount of time and may increase the accuracy of the translations provided by the translator accounts. Providing translator and/or project linguistic resources that are specific to each translator account and/or project may further reduce the amount of time and may further increase the accuracy of the translations provided by the translator accounts for the translation projects.

The details of one or more implementations are set forth in the accompanying drawings and the description below. Other features and advantages will be apparent from the description and drawings, and from the claims.

FIG. 1A is a schematic diagram that shows an example of a system 100 for providing a computer-aided or assisted translation using a collaborative translation system that has multiple account types, such as corporate and personal account types, and multiple profile types, such as public and private profile types. The system 100 includes a collaborative translation system 102 in communication with at least one client system 124 and multiple translator systems 104a-c over a network 106, such as local area network, a wide area network, or one or more of the computing devices that make up the Internet. The translator systems 104a-c are used by multiple translation professionals 108a-c to translate electronic documents at the direction of the collaborative translation system 102.

The collaborative translation system 102 may receive, from the client system 124, one or more inputs that make up a request to translate an electronic document for a translation project, for example, through at least one interface device 110 to the network 106. The interface device 110 provides communication between the collaborative translation system 102 and the network 106 or networks used to communicate with the client system 124 and the translator systems 104a-c. The request for the translation project may include the electronic document (or an address that the collaborative translation system 102 or another system may use to retrieve the electronic document), an identification of a source language of the electronic document, and/or an identification of a target language to which text or content of the electronic document is to be translated.

The collaborative translation system 102 further includes at least one processor 112, at least one memory 114, and at least one data storage device 116. The memory 114 stores instructions for one or more modules, such as a graphical user interface module (GUI module) 118. The processor 112 (and/or corresponding processors at the translator systems 104a-c) executes the instructions of the GUI module 118 to perform the operations described herein.

The users of the collaborative translation system 102 are each associated with and/or represented by a corresponding one of multiple personal accounts 120a-e that may be stored, for example, at the collaborative translation system 102 in the data storage device 116. The personal accounts 120a-e may represent, for example, users that interact with the collaborative translation system 102, such as a translator that performs translation for the translation project, a manager that supervises the translation project, and/or a person that creates linguistic resources for the translation project. The businesses that interact with the collaborative translation system 102 are each associated with and/or represented by corresponding one of multiple corporate accounts 138a-b that may be stored, for example, at the collaborative translation system 102 in the data storage device 116. The corporate accounts 138a-b may represent, for example, a client that requests translation for a translation project, a translator that performs translation for the translation project, and/or a translation vendor that manages or performs translation for the translation project.

The processor 112 may execute the instructions of the GUI module 118 to provide one or more graphical user interfaces to the client system 124 and the translator system 104a-c. The processor 112 may provide one or more of the graphical user interfaces, such as an administrative graphical user interface and a translation graphical user interface, by providing data to an application at the client system 124 and the translator system 104a-c. The application may be a desktop application, a mobile app, and/or a web browser. In some implementations, the data may include markup or code for one or more web-based languages, such as HyperText Markup Language (HTML), Cascading Style Sheets (CSS), Javascript, and/or Extensible Markup Language (XML).

For example, the GUI module 118 may provide the administrative graphical user interface to the client system 124 for an account of a client or vendor requesting translation for a translation project in the collaborative translation system 102. The GUI module 118 may receive one or more inputs from the account at the client system 124 through the administrative graphical user interface indicating accounts of one or more of the translation professionals to be assigned to the translation project. Each of the accounts of the translation professionals may be for an individual translator or a translation vendor company having multiple translators.

In response to receiving the inputs, the collaborative translation system 102 may then assign and/or notify the selected accounts of the translation to be performed for the translation project. The collaborative translation system 102 may provide the text, or at least a portion thereof, to ones of the translator systems 104a-c for the selected ones of the accounts in a translation graphical user interface. The collaborative translation system 102 provides access to one or more linguistic resources to each of the selected translator accounts for the translation project. The linguistic resources for each translator account may include one or more translation memories (e.g., stored translations of phrases from previous translation work), one or more glossaries (e.g., database of terms or words and translations of the terms or words), one or more regular expressions defining a search pattern and replacement text, or identification of one or more machine translation engines. The translation graphical user interface may provide each translator account with access to project linguistic resources provided by the client account and/or the vendor account. The project linguistic resources may be provided to the translator accounts within the translation graphical user interface for the assigned translation project and not within other translation projects in the translation graphical user interface. The translation graphical user interface may provide each translator account with access to translator linguistic resources that are specific to the translator account. The translation graphical user interface may prevent each translator account from accessing translator linguistic resources of others of the translator accounts even though the others may also be assigned to the same translation project.

The translation graphical user interface integrates with the linguistic resources to aid or assist in the translation of the text for the translation project. The ones of the translator systems 104a-c that have been assigned to the translation project receive the translations from the translation professionals at the translator systems 104a-c. The ones of the translator systems 104a-c then provide the translations to the collaborative translation system 102. The collaborative translation system 102 receives the translations and provides a final translation of the electronic document for the translation project, based on the received translations, to the client system 124.

Figure 1B:
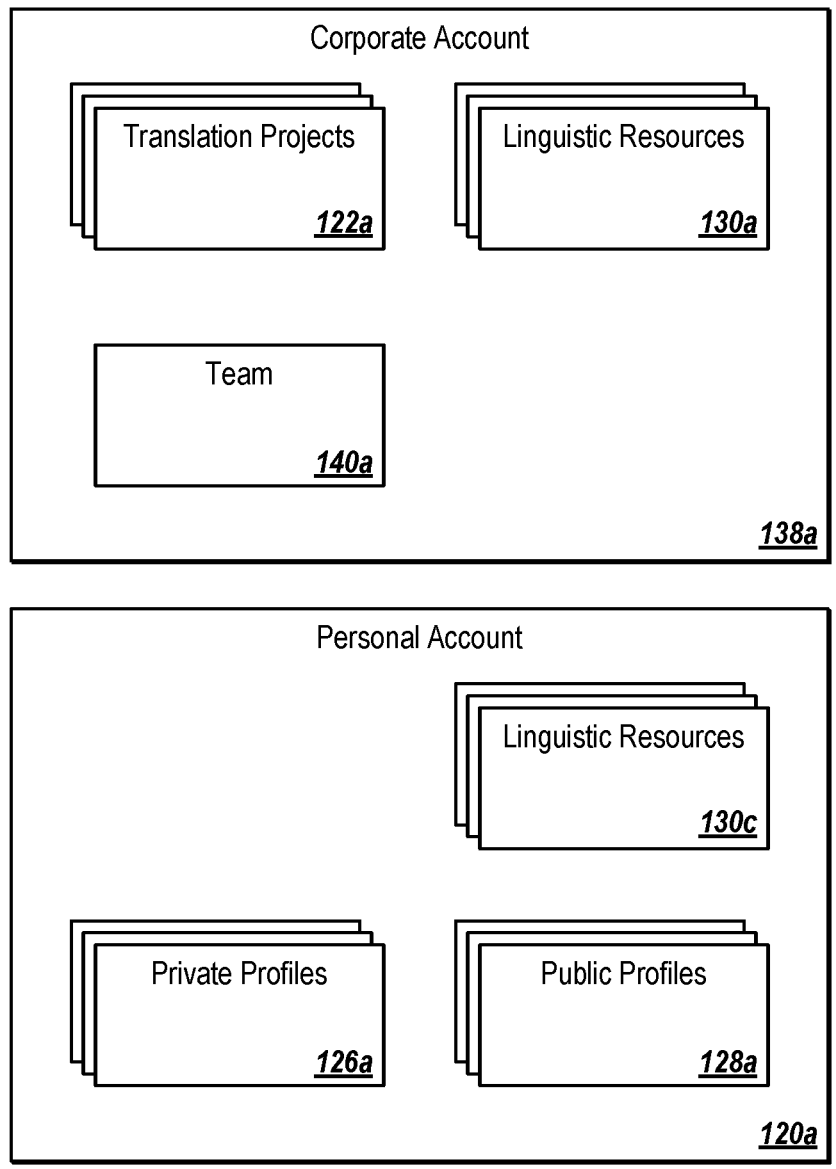
FIG. 1B is a block diagram that shows an example of multiple account types of the collaborative translation system.

FIG. 1B is a block diagram that shows an example of multiple account types for the collaborative translation system 102 including the first corporate account 138a and the first personal account 120a. The first corporate account 138a may be a client account type. As a client account type, the first corporate account 138a may include one or more translation projects 122a. The collaborative translation system 102 may allow the first corporate account 138a to delegate management of the translation for one or more of the translation projects 122a to another one of the corporate accounts 138a-b, as the second corporate account 138b. In some implementations, the delegation relationship between the first corporate account 138a and the second corporate account may be bi-directional, such that the first corporate account 138a may delegate one or more translation tasks to the second corporate account 138b and the second corporate account 138b may delegate one or more translation tasks to the first corporate account 138a. The first personal account 120a may be a translator account. As a translator account, the collaborative translation system 102 allows the first corporate account 138a and/or the second corporate account 138b to add to the first personal account 120a to a list or a first team 140a of translators for the first corporate account 138a or the second corporate account 138b, respectively, and also to assign the first personal account 120a to perform translation for one or more of the translation projects 122a. Each of the corporate accounts 138a-b and the personal accounts 120a-c may include one or more linguistic resources 130a-c. Each of the personal accounts 120a-c may include one or more private profiles 126a-d and/or at least one public profile 128a-c.

The GUI module 118 provides a graphical user interface to the client system 124 that allows a user for the first corporate account 138a to input information for each of the translation projects 122a of the first corporate account 138a, such as one or more electronic documents or files to be translated and a source and target language for the translation of each document. The graphical user interface may also allow the user for the first corporate account 138a to assign one or more of the first linguistic resources 130a of the first corporate account 138a to one or more of the translation projects 122a as a project linguistic resource to be accessed by translator accounts assigned to the translation project. In this case of creating and/or administering the first translation projects 122a, the first corporate account 138a may act in the capacity of a client.

To act in a translator capacity, the first personal account 120a specifies information that describes the types and/or terms of translation for the user of the first personal account 120a, such as source and target language pairs and rates for compensation. The first public profile 128a of the first personal account 120a indicates that the first personal account 120a is also acting in a translator capacity that is participating in a pool of freelance translators. The graphical user interface allows the user of the first personal account 120a to make certain information from the first personal account 120a publicly available so that the corporate accounts 138a-b for the clients or translation vendors may identify and select the first public profile 128a to be invited to a team of translators.

When the first personal account 120a is placed in a team of translators and/or assigned to a translation project, one of the first private profiles 126a is created for the first personal account 120a in that client or vendor corporate account or for that translation project. Where the assignment originated from the pool of freelance translators, the collaborative translation system 102 may copy the settings from the first public profile 128a to the corresponding one of the first private profiles 126a for the translation project. Alternatively, an account for a client (such as the first corporate account 138a) may directly assign one of the first private profiles 126a of the first personal account 120a to the translation project, for example, where the corresponding one of the first private profiles 126a was already placed in a team for the client or the translation vendor.

The settings in the first private profiles 126a may differ from the corresponding settings in the first personal account 120*a* and/or the first public profile 128*a*. For example, the user of the first personal account 120*a* may make public a particular per-word rate for translations between a particular source and target language pair in the first public profile 128*a*. The graphical user interface may allow the user of the first personal account 120*a* to later specify a new rate for the language pair when the corresponding one of the first private profiles 126*a* is created for a translation project.

Figure 1C:
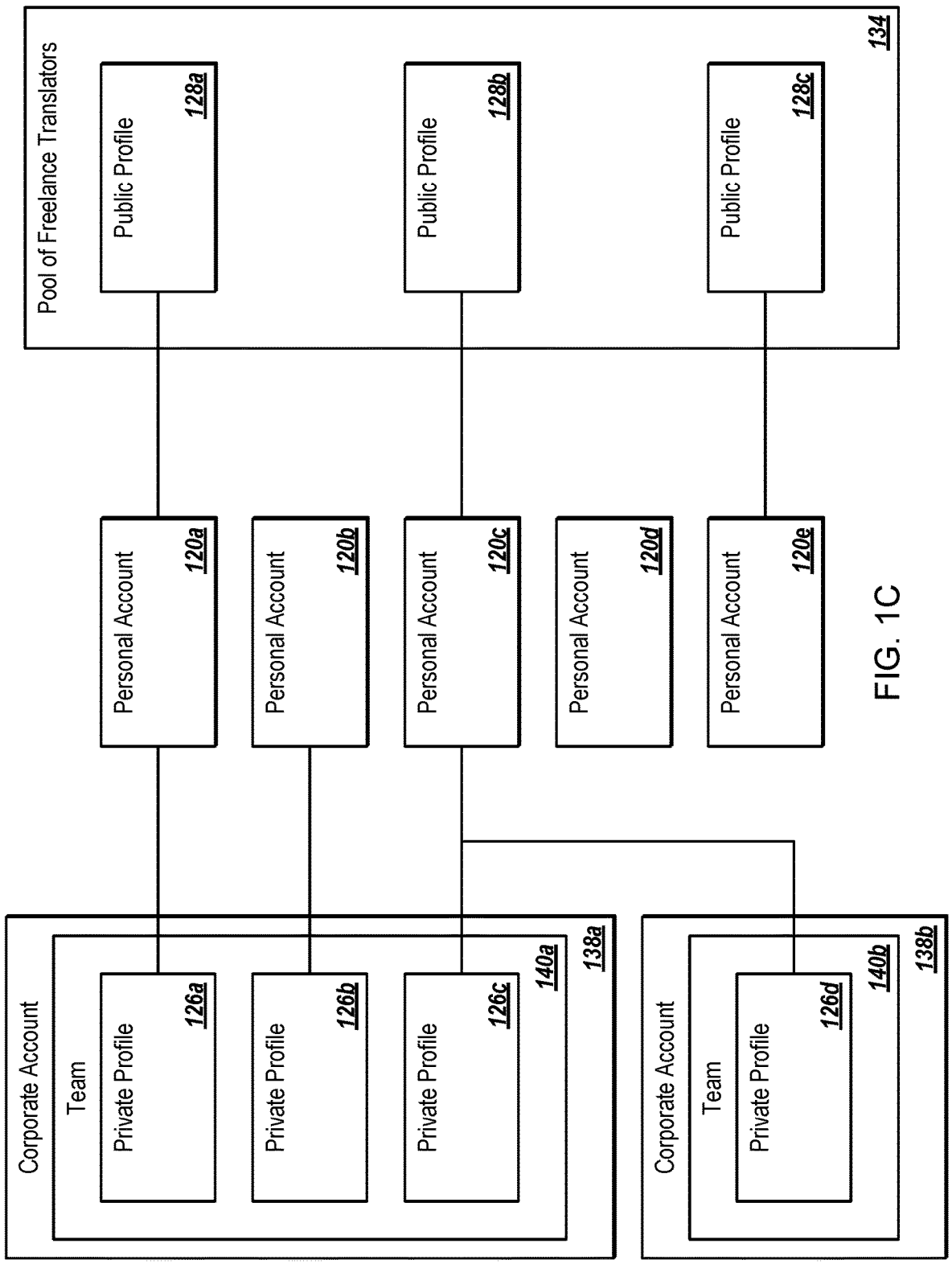
FIG. 1C is a schematic diagram that shows an example of multiple public profiles and multiple private profiles of personal accounts used with a graphical user interface for collaborative translation.

FIG. 1C is a schematic diagram that shows an example of the public profiles 128*a-c* and the private profiles 126*a-d* of the personal accounts 120*a-e* for use with a graphical user interface for collaborative translation. As previously described, the first personal account 120*a* may have the first public profile 128*a* and the first private profiles 126*a*. One of the first private profiles 126*a* may be added to the first team 140*a* and assigned to a translation project for the first corporate account 138*a*. Also, the first personal account 120*a* is participating in a pool of freelance translators 134 by way of the first public profile 128*a*.

In some implementations, an account may have no public profile (e.g., is not participating in the pool of freelance translators 134), no private profiles (e.g., has not been placed in a team and/or assigned to translation project), multiple private profiles (e.g., has been placed in multiple teams and/or assigned to multiple translation projects), or multiple public profiles (e.g., is participating in separate pools of freelance translators or as separate translators in a pool of freelance translators). For example, the second personal account 120*b* has the second private profile 126*b* in the first corporate account 138*a*, but does not have a public profile. The third personal account 120*c* has the second public profile 128*b* in the pool of freelance translators 134. The collaborative translation system 102 has also added the third private profile 126*c* of the third personal account 120*c* to the first team 140*a* in the first corporate account 138*a*, and the fourth private profile 126*d* to a second team 140*b* in the second corporate account 138*b*. The fourth personal account 120*d* has no public profile (e.g., is not participating in the pool of freelance translators 134) and no private profiles (e.g., has not been placed in a team and/or assigned to a translation project). The fifth personal account 120*e* has the third public profile 128*c* indicating that the fifth personal account 120*e* is participating in the pool of freelance translators 134, but has no private profiles indicating that the fifth personal account 120*e* has not been placed in a team and/or assigned to a translation project.

Figure 1D:
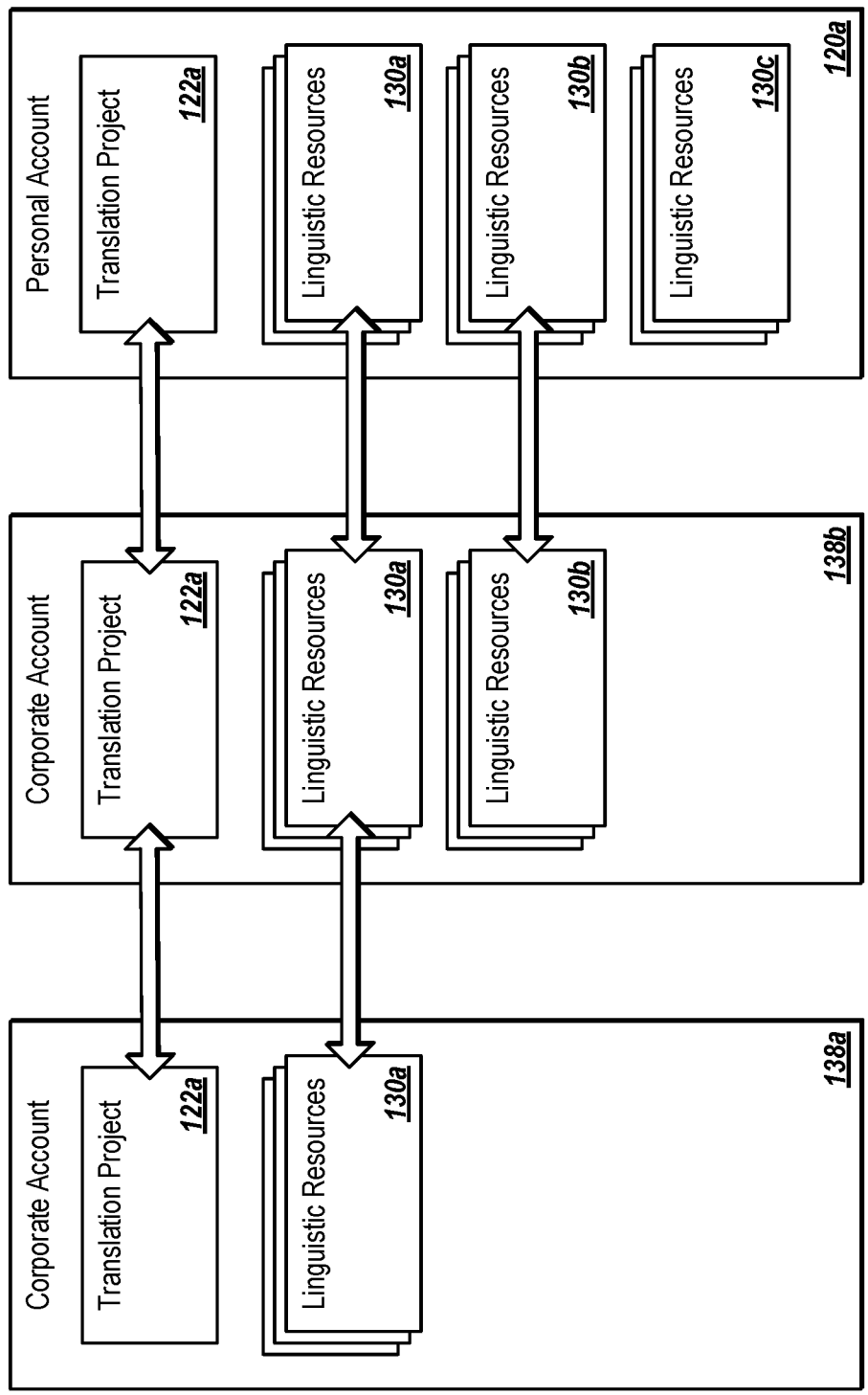
FIG. 1D is a schematic diagram that shows an example of a translation project and linguistic resources that are shared between corporate and personal accounts for use with a graphical user interface for collaborative translation.

FIG. 1D is a schematic diagram that shows an example of a translation project and linguistic resources that are shared between corporate and personal accounts for use with a graphical user interface for collaborative translation. The first corporate account 138*a* may represent a business, such as a client for which the translation is being performed, and includes the first translation project 122*a*. The first corporate account 138*a* has delegated management of the first translation project 122*a* to the second corporate account 138*b*. The second corporate account 138*b* may represent another business, such as a translation vendor to which administration or management of a translation project may be delegated. Accordingly, the collaborative translation system 102 provides management access of the translation project 122*a* to, for example, the second corporate account 138*b*. For management access, the GUI module 118 may provide an administrative graphical user interface to the second corporate account 138*b* that allows a user for the second corporate account 138*b* to invite public profiles or private profiles to a team of translators for the second corporate account 138*b*, such as a profile of the first personal account 120*a*. In some implementations, the GUI module 118 creates the private profile 126*a* for the first personal account 120*a* when the first personal account 120*a* is placed in the team for the second corporate account 138*b* if the first personal account 120*a* does not already have a private profile with the second corporate account 138*b*. The GUI module 118 may copy settings from the first public profile 128*a* of the first personal account 120*a* if the second corporate account 138*b* added the first personal account 120*a* from the pool of freelance translators 134. Otherwise, the GUI module 118 may create the first private profile 126*a* from the first personal account 120*a*. The administrative graphical user interface may then allow the second corporate account 138*b* to assign the public or private profiles to the translation project 122*a*. Accordingly, the collaborative translation system 102 provides translator access of the translation project 122*a* to the first private profile 126*a* of the first personal account 120*a*.

The GUI module 118 may allow the first corporate account 138*a* to associate one or more of the first linguistic resources 130*a* with the first translation project 122*a* as project linguistic resources. Accordingly, the GUI module 118 provides access to the first linguistic resources 130*a* to the second corporate account 138*b* and the first private profile 126*a* of the first personal account 120*a*. The first corporate account 138*a* may specify and the GUI module 118 may provide the second corporate account 138*b* with one or more administrative level permissions, such as permission to modify a glossary, a translation memory, or the selected machine translation engines for the first linguistic resources 130*a*. The GUI module 118 may provide the first private profile 126*a* with a translator level of permission to the first linguistic resources 130*a*, such as by only allowing translation suggestions to be provided from the first linguistic resources 130*a* without modifying the first linguistic resources 130*a*.

The GUI module 118 may allow the second corporate account 138*b* to associate one or more of the second linguistic resources 130*b* with the first translation project 122*a* as project linguistic resources. Accordingly, the GUI module 118 provides full access to the second linguistic resources 130*b* to the second corporate account 138*b* and a limited level of access to the first private profile 126*a* of the first personal account 120*a*. For example, the GUI module 118 may provide the first private profile 126*a* with a translator level of permission to the second linguistic resources 130*b*, such as by only allowing translation suggestions to be provided from the second linguistic resources 130*b* without modifying the second linguistic resources 130*b* or providing direct access to the contents of the second linguistic resources 130*b*. In some implementations, all of the private profiles assigned to the first translation project 122*a* have at least a translator level of permission to the first linguistic resources 130*a* and/or the second linguistic resources 130*b*.

The GUI module 118 may allow the first personal account 120*a* to associate one or more of the third linguistic resources 130*c* with the first translation project 122*a* as translator linguistic resources. Accordingly, the GUI module 118 provides access to the third linguistic resources 130*c* to the first private profile 126*a* of the first personal account 120*a* and none of the other private profiles that may be assigned to the first translation project 122*a* or any of the corporate accounts 138*a-b* even though the first corporate account 138*a* may have created the translation project and may have delegated the translation project to the second corporate account 138*b*. In addition, the GUI module 118 may not provide the first personal account 120*a* with full access to project linguistic resources, such as the first linguistic resources 130a or the second linguistic resources 130b. For example, the GUI module 118 may provide individual translation suggestions from the first linguistic resources 130a and/or the second linguistic resources 130b, but the GUI module 118 does not allow the first personal account 120a to download or directly access the entire contents of the first linguistic resources 130a or the second linguistic resources 130b. Furthermore, the GUI module 118 may not provide the second corporate account 138b with full access to the first linguistic resources 130a that were delegated to the second corporate account 138b with the translation project 122a. For example, the GUI module 118 may provide individual translation suggestions from the first linguistic resources 130a, but the GUI module 118 does not allow the second corporate account 138b to download or directly access the entire contents of the first linguistic resources 130a.

Figure 2A:
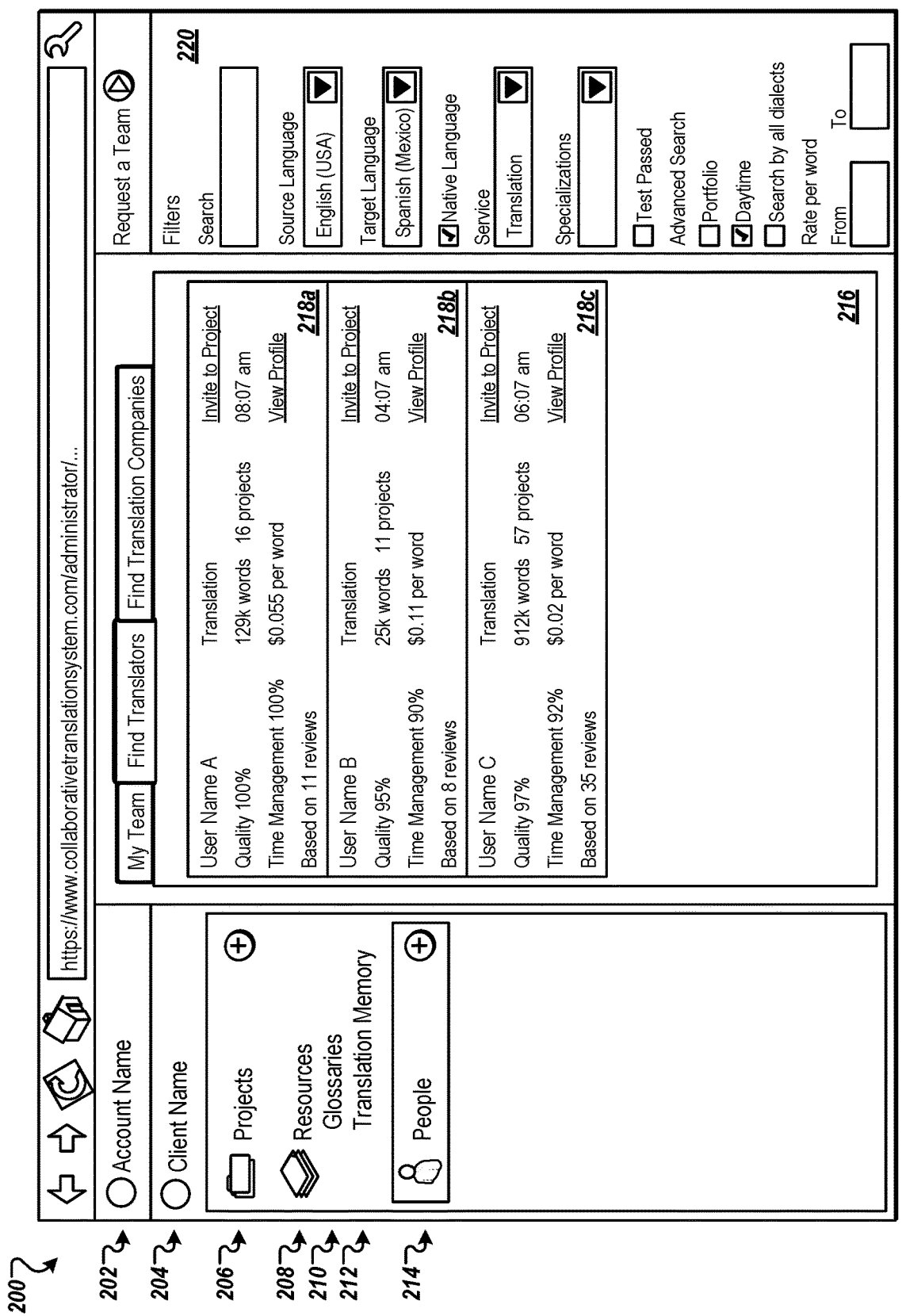
FIG. 2A shows an example of an administrative graphical user interface for collaborative translation.

FIG. 2A shows an example of an administrative graphical user interface 200 for collaborative translation. The administrative graphical user interface 200 may be, for example, a web page presented in a web browser application. The processor 112 of the collaborative translation system 102 may execute the instructions of the GUI module 118 to provide the administrative graphical user interface 200 to the client system 124.

The GUI module 118 may receive authentication information from the client system 124 for the first corporate account 138a. In response to successful authentication of the first corporate account 138a, the GUI module 118 provides the administrative graphical user interface 200 to the client system 124. The administrative graphical user interface 200 includes an account name 202 that indicates the name of the first corporate account 138a. The account name 202 may be a menu item that allows the user to select the account name 202 to request a graphical user interface for inputting account information. The administrative graphical user interface 200 may also include a client name 204 that indicates the name of a client, vendor, business, or company associated with the first corporate account 138a. The client name 204 may be a menu item that allows the user to select the client name 204 to request the administrative graphical user interface 200 for inputting client information.

The administrative graphical user interface 200 also includes a projects menu item 206. The administrative graphical user interface 200 may present a graphical user interface for inputting translation project information in response to selection of the projects menu item 206. The administrative graphical user interface 200 may create the first translation project 122a in response to selection of a translation project creation input control. The administrative graphical user interface 200 may receive further inputs from the first corporate account 138a that include, for example, a name for the first translation project 122a, one or more electronic documents to be translated, and/or one or more source languages and one or more target languages for each electronic document to be translated.

The administrative graphical user interface 200 also includes a project linguistic resources menu item 208. The project linguistic resources menu item 208 includes a project glossaries sub-menu item 210 and a project translation memory sub-menu item 212. The administrative graphical user interface 200 may present a graphical user interface for inputting project glossary information in response to receiving a user selection of the project glossaries sub-menu item 210. The graphical user interface for the project information may allow a user to indicate one or more of the project glossaries to be used by the collaborative translation system 102 for the first translation project 122a. The administrative graphical user interface 200 may receive user inputs in fields or user selections of input controls to create a project glossary and that specify, for example, a name for the project glossary, a source language and a target language, and/or one or more words in the source language and the target language (e.g., through manual entry or an upload of a file containing the glossary items).

The administrative graphical user interface 200 may present a graphical user interface for inputting project translation memory information in response to receiving a user selection of the project translation memory sub-menu item 212. The graphical user interface for the project information may allow a user to indicate one or more of the project translation memories to be used by the collaborative translation system 102 for the first translation project 122a. The administrative graphical user interface 200 may receive user inputs in fields or user selections of input controls to create a project translation memory and that specify, for example, a name for the project translation memory, a source language and a target language, and/or one or more segments in the source language and the target language. A segment may be a phrase containing one or more words, such as a sentence. A segment may be a unit of translation within the collaborative translation system 102 such that each segment of an electronic document within a translation project may be separately claimed for translation by one of the translator accounts assigned to the translation project.

The administrative graphical user interface 200 may present a graphical user interface for assigning one or more translator accounts to the translation project in response to a user selection of a people menu item 214. The administrative graphical user interface 200 may present a list of private profiles of translator accounts associated with the client name (e.g., the first team 140a) in response to a user selection of a "My Team" input control. The GUI module 118 may pre-select the list of private profiles for display in the administrative graphical user interface 200 by only displaying only those ones of the private profiles in the first team 140a that have language pairs that match the language pairs for the translation project. The administrative graphical user interface 200 may present a list of translation companies (e.g., the translation vendor) to which the first corporate account 138a may delegate the first translation project 122a to another corporate account, such as the second corporate account 138b, in response to a user selection of a "Find Translation Companies" input control. The administrative graphical user interface 200 may also present a list 216 of information for one or more freelance translator accounts 218a-c in response to a user selection of a "Find Translators" input control, for example, to initiate a search among public profiles for freelance translators. The list 216 may be the result of one or more filter inputs received from the user in user input controls within a filters area 220.

The filters area 220 of the administrative graphical user interface 200 includes a search input field that allows a user to input one or more keywords to search for within the names of the freelance translator accounts or other information within the freelance translator accounts. The filters area 220 includes source language and target language input fields (e.g., combination pull-down list and text entry) that allow a user to input a source language and/or a target language to specify the source and/or target languages supported by the freelance translator accounts in the list 216. The available lists of source and target languages may indicate a general language, such as "English" or "Spanish,"

or a region specific dialect of a language, such as "English (USA)," "English (UK)," "Spanish (Spain)", and/or "Spanish (Mexico)." The filters area 220 includes a native language input control that allows a user to specify whether the freelance translator accounts in the list 216 must be native speakers of the selected source and/or target languages for the translation project. The filters area 220 includes a service input control that allows a user to specify the types of services that the freelance translator accounts in the list 216 be able to provide for the translation project, such as translation, editing, proofreading, and/or post-editing. In some implementations, the types of services may also include other translation related types of services, such as desktop publishing, project management, glossary creation, simultaneous translation, consecutive translation, audiovisual translation, quality assurance, translation memory creation & maintenance, copywriting, or training. The filters area 220 includes a specialization input control that allows a user to specify the types of specializations that the freelance translator accounts in the list 216 must provide for the translation project, such as accounting, legal, and/or software. The filters area 220 includes a test input control that allows a user to specify whether the freelance translator accounts in the list 216 have passed a test or are certified by an accrediting agency for the translation from the source language to the target language. The filters area 220 includes a portfolio input control that allows a user to specify whether the freelance translator accounts in the list 216 can provide a portfolio of previous translation work. The filters area 220 includes a daytime input control that allows a user to specify whether the freelance translator accounts in the list 216 are currently in a time zone that is in the daytime and/or typical business hours. The filters area 220 includes an all dialects input control that allows a user to specify whether the source and/or target languages supported by the freelance translator accounts in the list 216 may be dialects other than the dialects for the source and target languages of the translation project. The filters area 220 includes an all dialects input control that allows a user to specify a range of rates that are allowed for the freelance translator accounts in the list 216.

The client system 124 may receive the user inputs from the filters area 220 of the administrative graphical user interface 200 and provide the user inputs to the GUI module 118 at the collaborative translation system 102. The GUI module 118 performs a search of the freelance translator accounts within the collaborative translation system 102 based on the received user inputs. The GUI module 118 provides information for the freelance translator accounts 218*a-c* to the client system 124 for presentation in the administrative graphical user interface 200.

The administrative graphical user interface 200 may present a name for each of the freelance translator accounts 218*a-c* in the list 216 and a local time of each of the freelance translator accounts 218*a-c*. The administrative graphical user interface 200 may present statistics for each of the freelance translator accounts 218*a-c* based on the selected type of service in the filter (e.g., "Translation") and the selected source and target languages. The statistics for the service and the source/target language combination may include, for example, a number of words translated in the collaborative translation system 102, a number of translation projects for the translations, a quality of the translations, a rate the freelance translator charges for the translations, and/or a rating of the time management of the freelance translator account. The GUI module 118 may invite one or more of the freelance translator accounts 218*a-c* to join a team of translators for the first corporate account 138*a* and/or to be assigned to the translation project in response to one or more user selections of invitation input controls for the freelance translator accounts 218*a-c*.

In the case where translators are added to the first team 140*a*, the GUI module 118 may receive requests from the first corporate account 138*a* to assign ones of the invited ones of the freelance translator accounts 218*a-c* to the translation project in response to receiving confirmations from the respective ones of the freelance translator accounts 218*a-c* at the translator systems 104*a-c*. The freelance translator accounts 218*a-c* may each have a public profile and one or more private profiles. The administrative graphical user interface 200 may present information from the public profiles of the freelance translator accounts 218*a-c* in the list 216. Once the GUI module 118 adds the freelance translator accounts 218*a-c* to the team and/or assigns the freelance translator accounts 218*a-c* to the translation project, the GUI module 118 may create the private profiles for the freelance translator accounts 218*a-c*. The GUI module 118 may initially copy the information from the public profiles to the private profiles for each of the freelance translator accounts 218*a-c* if the accounts do not already have private profiles with the first corporate account 138*a*. The GUI module 118 may then receive specific terms (e.g., rate per word translated and/or any due dates for the translations of the electronic documents) for the translation agreed upon by the corporate account and the freelance translator accounts 218*a-c*, which may be different than the information in the public profiles. The GUI module 118 may update the private profiles with the specific terms. The GUI module 118 may then provide the freelance translator accounts 218*a-c* at the translator systems 104*a-c* with a translation graphical user interface to collaboratively translate the segments of the electronic documents for the translation project. While FIG. 2A is described above with respect to the first corporate account 138*a*, the operations performed for the first corporate account 138*a* may instead be performed by another corporate account, such as the second corporate account 138*b*.

FIG. 2B shows an example of a translation graphical user interface 250 for collaborative translation. The translation graphical user interface 250 may be, for example, a web page presented in a web browser application. The processor 112 of the collaborative translation system 102 may execute the instructions of the GUI module 118 to provide the translation graphical user interface 250 to the translator systems 104*a-c*.

The GUI module 118 may receive authentication information from the translator systems 104*a-c* for corresponding ones of the freelance translator accounts 218*a-c*. In response to successful authentication of the authentication information for an account, the GUI module 118 provides the translation graphical user interface 250 to the respective one of the translator systems 104*a-c*. The GUI module 118 may first provide a graphical user interface to the translator systems 104*a-c* that presents a list of the translation projects to which the respective one of the freelance translator accounts 218*a-c* has been assigned as well as lists of the electronic documents to be translated within each of the translation projects. The GUI module 118 may receive a user selection of one of the electronic documents from the respective one of the translator systems 104*a-c*. In response to receiving the user selection, the GUI module 118 may provide the translation graphical user interface 250 for selected electronic document to the respective one of the translator systems 104*a-c*.

The translation graphical user interface 250 includes a title bar area 252. The title bar area 252 may present information about the translation, such as the task or service to be performed (e.g., "Translation"), the name of the translation project (e.g., "Test Project A"), and/or the name of the electronic document currently being translated in the translation graphical user interface 250 (e.g., "Test Document C").

The translation graphical user interface 250 includes a segments area 254, a CAT area 256, and a CAT info area 258. The segments area 254 presents a list of segments from the electronic document to be translated by the freelance translator accounts 218a-c that are assigned to the translation project. Each of the segments may be, for example, a sentence from the electronic document. The segments in the segments area 254 include a first source language segment ("The quick brown fox jumps over the lazy dog."), a second source language segment ("The quick brown fox jumped over the lazy dog."), and a third source language segment ("The quick red fox jumped over the lazy dog."). The segments area 254 also includes a column for receiving inputs that include the target language translations of the source language segments. The GUI module 118 may collaboratively receive the target language translations of the source language segments from the translator systems 104a-c for the respective ones of the freelance translator accounts 218a-c at separate and/or contiguous time intervals. For example, the GUI module 118 may receive a target language translation for a first segment from the first translator system 104a for the first freelance translator account 218a while a target language translation for a second segment in the same electronic document is being entered by the second freelance translator account 218b or received by the GUI module 118 from the second translator system 104b for the second freelance translator account 218b.

The GUI module 118 uses linguistic resources for the translation project and/or the first freelance translator account 218a to provide one or more translation suggestions in the CAT area 256. CAT as used here refers to computer-aided translation and/or computer-assisted translation. The GUI module 118 may receive a user selection of one of the segments, such as the third segment as indicated by the shading in FIG. 29, in the segments area 254 through the translation graphical user interface 250 at the translator system 104a from the first freelance translator account 218a. In response to receiving the user selection, the GUI module 118 uses the linguistic resources to generate the translation suggestions for the third segment.

For example, the GUI module 118 may search for the words and/or phrases within the third source language segment in one or more glossaries or terminology databases (TB) for the translation project and/or for the first freelance translator account 218a. If the GUI module 118 finds a word or phrase from the third segment in the glossaries (e.g., "lazy"), then the GUI module 118 includes the corresponding target language translation of the word or phrase (e.g., "gandul") in the translation suggestions in the CAT area 256. The GUI module 118 may indicate that the suggestion is from a glossary or terminology database with an abbreviation or symbol (e.g., "TB"). In the case where the word or phrase is found in a project glossary, the GUI module 118 may provide the translation suggestion in the translation graphical user interface 250 when presented for each of the freelance translator accounts 218a-c assigned to the translation project. However, if the word or phrase is found in a translator glossary (e.g., of the first freelance translator account 218a), then the GUI module 118 may provide the translation suggestion in the translation graphical user interface 250 when presented for the first freelance translator account 218a without providing the suggestion for the translator glossary of the first freelance translator account 218a to the others of the freelance translator accounts 218b-c or the corporate account for the translation project.

In another example, the GUI module 118 may search for the source language text of the third segment in one or more translation memories (TM) for the translation project and/or the translator. Each of the translation memories includes the source language text and target language text for previously translated segments as well as an indication of the source and target languages. The previously translated segments in the translation memories may be continuously updated as new segments are translated. The translation memories may include previously translated segments from multiple translation projects. If the GUI module 118 finds the text of the third segment or text that has a threshold level of similarity to the text of third segment in the translation memories (e.g., "The quick brown fox jumps over the lazy dog."), then the GUI module 118 includes the corresponding target language translation from the entry in the translation memory (e.g., "El rápido zorro marrón salta sobre el perro perezoso.") in the translation suggestions in the CAT area 256. The GUI module 118 may indicate that the suggestion is from a translation memory with an abbreviation or symbol (e.g., "TM"). The GUI module 118 may indicate a level of similarity between the third segment and the source language text in the translation memory (e.g., "86%"). In the case where the segment is found in a project translation memory, the GUI module 118 may provide the translation suggestion in the translation graphical user interface 250 when presented for each of the freelance translator accounts 218a-c assigned to the translation project. However, if the word or phrase is found in a translator translation memory (e.g., of the first freelance translator account 218a), then the GUI module 118 may provide the translation suggestion in the translation graphical user interface 250 when presented for the first freelance translator account 218a without providing the suggestion for the translator translation memory of the first freelance translator account 218a to the others of the freelance translator accounts 218b-c or the corporate account for the translation project.

In yet another example, the GUI module 118 may provide the text of the third segment to a machine translation service for the project and/or the translator account. The GUI module 118 includes the corresponding target language machine translation from the machine translation service (e.g., "El rápido zorro rojo salta sabre el perro perezoso.") in the translation suggestions in the CAT area 256. The GUI module 118 may indicate that the suggestion is from a machine translation service with an abbreviation or symbol (e.g., "MT"). In the case of a project machine translation service, the GUI module 118 may provide the translation suggestion in the translation graphical user interface 250 when presented for each of the freelance translator accounts 218a-c assigned to the translation project. However, in the case of a translator machine translation service (e.g., of the first freelance translator account 218a), then the GUI module 118 may provide the translation suggestion in the translation graphical user interface 250 when presented for the first freelance translator account 218a without providing the suggestion for the translator machine translation service of the first freelance translator account 218a to the others of the freelance translator accounts 218b-c or the corporate account for the translation project.

The translation graphical user interface 250 may present multiple suggestions of each suggestion type for a selected segment in the CAT area 256. For example, where the project has multiple glossaries, the GUI module 118 may provide a glossary suggestion from each glossary. The GUI module 118 may provide a first glossary suggestion from a project glossary and a second glossary suggestion from a translator glossary. Similarly, the GUI module 118 may provide multiple translation memory suggestions that the GUI module 118 may obtain from multiple translation memories, such as a project translation memory and a translator translation memory. The GUI module 118 may provide multiple machine translation suggestions that the GUI module 118 may obtain from multiple machine translation services, such as a project machine translation service and a translator machine translation service.

The translation graphical user interface 250 allows the user to select one or more of the translation suggestions in the CAT area 256 to present additional information for the selected suggestion in the CAT info area 258. For example, in response to receiving a user selection of the second suggestion from the translation memory, as indicted by the shading in FIG. 2B, the GUI module 118 may provide additional information for the translation memory suggestion in the CAT info area 258. The additional information for a suggestion from a translation memory may include an indication of difference between the source language text from the corresponding segment of the electronic document to be translated and the source language text from the entry in the translation memory. For example, the GUI module may indicate deletions using a strikethrough font format and/or a first particular text or background color, and may indicate additions using an underlined font format and/or a second particular text or background color. The additional information may also indicate a name of the translation memory from which the GUI module 118 obtained the suggestion (e.g., "Test TM for Translator B"). In response to receiving a user selection of the first suggestion from the glossary, the GUI module 118 may provide additional information for the glossary suggestion in the CAT info area 258, such the name of the glossary and/or the source and target languages for the glossary. In response to receiving a user selection of the third suggestion from the machine translation service, the GUI module 118 may provide additional information for the machine translation suggestion in the CAT info area 258, such the name of the machine translation service.

The translation graphical user interface 250 may allow multiple types of user selections of the suggestions in the CAT area 256. In response to receiving a first type of user selection (e.g., a single click of a pointing device) of a suggestion in the CAT area 256, the GUI module 118 provides the additional information for the selected in the CAT info area 258. In response to receiving a second type of user selection (e.g., a double click of a pointing device or the single click and then a selection of an insert input control or button) of a suggestion in the CAT area 256, the GUI module 118 inserts the target language text of the selected suggestion into the corresponding segment for the suggestion in the segments area 254. In the case of a glossary suggestion, the GUI module 118 may insert the target language text at the point of a cursor or cursor selection in the target language input field of the segment or at a default location in the target language input field (e.g., at the beginning of the text in the input field) of the segment when the cursor is not currently in the field. In the case of a translation memory or machine translation suggestion, the GUI module 118 may replace the existing text in the target language input field of the segment with the target language text from the translation memory or machine translation.

The translation graphical user interface 250 may indicate a status of each of the segments in the segments area 254. The status may include a symbol or text indicating whether the task for the segment is in progress (e.g., "Translation") or complete (e.g., "Done"). The status may include a symbol or text indicating whether a suggestion was used for the segment and what type of suggestion was used (e.g., TB, TM, and/or MT), as well as the similarity between the source language text of the segment and the source language text of the entry from the translation memory in the case of a translation memory suggestions. The status may include an input control that allows the user to request that the segment be identified as complete, such as an unselectable-unmarked checkbox where no target language text has been entered and the segment may not be identified as complete, a selectable-marked checkbox where target language text has been entered and the segment may be identified as complete, and an unselectable checkmark where target language text has been entered and the segment is now identified as complete.

The GUI module 118 may update the statistics for each of the freelance translator accounts 218a-c in the corresponding ones of the private profiles. The GUI module 118 use the updated statistics in subsequent searches for freelance translator accounts by corporate accounts for other translation projects.

Similar to the project linguistic resources menu item 208 of the administrative graphical user interface 200, the translation graphical user interface 250 may include a graphical user interface, menu items, and sub-menu items for inputting information for glossaries and translation memories. With regard to the translation graphical user interface 250, the glossaries and translation memories are specific to the translator and are not made available to projects unless the freelance translator account is given permission to add glossaries and/or translation memories to the project and the GUI module 118 receives a user input from the freelance translator account indicating the addition. The GUI module 118 may store translator glossaries and translation memories in the private profile for the freelance translator account. When the freelance translator account is assigned to the project, then the translation graphical user interface 250 may allow the user for the freelance translator account to request that one or more of the translator glossaries or translation memory for the freelance translator account be used in the project by the freelance translator account without providing access the requested glossaries or translation memories to other freelance translator accounts assigned to the project or the corporate account.

Figure 3:
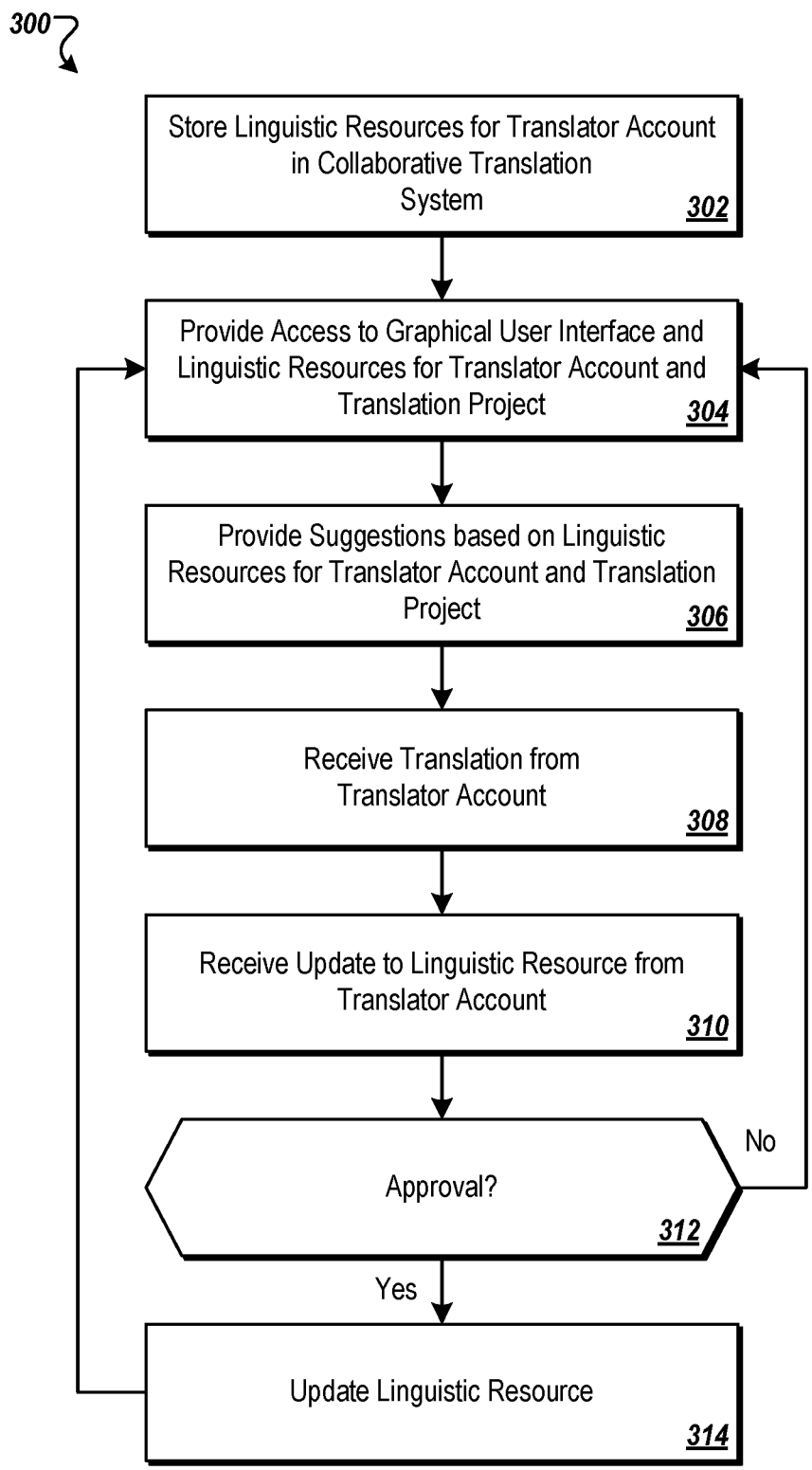
FIG. 3 is flow chart that shows an example of a process for providing a graphical user interface for collaborative translation.

FIG. 3 is a flow chart that shows an example of a process 300 for providing a graphical user interface for collaborative translation, in accordance with some aspects of the same disclosure. The process 300 may be performed, for example, by a system such as the system 100. For clarity of presentation, the description that follows uses the system 100 as an example for describing the process 300. However, another system, or combination of systems, may be used to perform the process 300.

The process 300 begins, at box 302, with storing, by at least one processor in a collaborative translation system, one or more linguistic resources for translator accounts of the collaborative translation system. Each translator account may be associated with a user that provides translation services through the collaborative translation system. Each translator account may represent a freelance translator or a translation vendor company. The linguistic resources may include a translation memory, a glossary, one or more regular expressions, or identification of a machine translation engine. For example, the collaborative translation system 102 may store the project and translator linguistic resources in the data storage device 116.

At box 304, the process 300 includes providing, by the processor, access to a graphical user interface for a translation project to a translator account in response to a request from a computing device for a corporate account of the collaborative translation system. The corporate account may be associated with a user that administers the translation project within the collaborative translation system. The translation project includes text in at least one source language to be translated into at least one target language. For example, the processor 112 in the collaborative translation system 102 may execute the instructions of the GUI module 118 to provide the translation graphical user interface 250 to the translator systems 104*a-c* for the freelance translator accounts 218*a-c*.

At box 306, the process 300 includes providing one or more suggestions for translation of the portion in the graphical user interface for the translator account based on translation of the portion from the translation memory, the glossary, the regular expressions, or the identified machine translation engine. For example, the processor 112 in the collaborative translation system 102 may execute the instructions of the GUI module 118 to provide the translation suggestions in the CAT area 256 of the translation graphical user interface 250 to the translator systems 104*a-c* for the freelance translator accounts 218*a-c*.

At box 308, the process 300 includes receiving, by the processor through the graphical user interface, at least one translation of at least a portion of the text from the source language to the target language for the translation project from a computing device for the translator account. The graphical user interface provides access to the translator linguistic resources within the translation project for the translator account without providing access to the translator linguistic resources within the translation project for the corporate account or others of the translator accounts. In some implementations, receiving the translation may include receiving at least one selection of the suggestions from the translator account and adding the selection to the translation project as a translation for the portion. For example, the processor 112 in the collaborative translation system 102 may execute the instructions of the GUI module 118 to receive the translations of one or more of the segments in the segments area 254 of the translation graphical user interface 250 from the first translator system 104*a* for the first freelance translator account 218*a*.

At box 304, the process 300 may also include providing, by the processor, access to the graphical user interface for another translation project to the translator account in response to a request from a computing device for another corporate account of the collaborative translation system. The other corporate account may be associated with a user that administers the other translation project within the collaborative translation system. The other translation project includes another text in at least one source language to be translated into at least one target language. At box 308, the process 300 may also include receiving, by the processor through the graphical user interface, at least one translation of at least a portion of the other text from the source language to the target language for the other translation project from a computing device for the translator account. The graphical user interface provides access to the translator linguistic resources within the other translation project (e.g., the same translator linguistic resources were provided with the first translation project) for the translator account without providing access to the translator linguistic resources within the other translation project for the other corporate account or others of the translation accounts. For example, the processor 112 in the collaborative translation system 102 may execute the instructions of the GUI module 118 to receive the translations of one or more of the segments in the segments area 254 of the translation graphical user interface 250 from the second translator system 104*b* for the second freelance translator account 218*b*.

At box 302, the process 300 may also include storing, by the processor, one or more other translator linguistic resources for another translator account of the collaborative translation system. The other translator account may be associated with a user that provides translation services through the collaborative translation system. At box 304, the process 300 may also include providing, by the processor, access to the graphical user interface for the translation project to the other translator account in response to a request from a computing device for the corporate account. At box 308, the process 300 may also include receiving, by the processor through the graphical user interface, at least one other translation of at least a portion of the text from the source language to the target language for the translation project from a computing device for the other translator account. The graphical user interface provides access to the other translator linguistic resources within the translation project for the other translator account without providing access to the other translator linguistic resources within the translation project for the corporate account, without providing access to the other translator linguistic resources within the translation project for the first translator account, and without providing access to the first translator linguistic resources within the translation project for the other translator account.

At box 302, the process 300 may also include storing, by the processor, one or more project linguistic resources for the first corporate account. The process 300 may also include receiving, by the processor, a request from a computing device for the corporate account to add the project linguistic resources to the translation project. The graphical user interface may also provide access to the project linguistic resources within the translation project for the translator account, the other translator account, and/or the corporate account in response to the project linguistic resources being added to the translation project without providing access to the project linguistic resources within other translation projects in the collaborative translation system for which the project linguistic resources have not been added.

At box 310, the process 300 includes receiving, by the processor, at least one update to the project linguistic resources from a computing device for the translator account.

At box 312, if approval is required from a corporate or administrator account for the translation project, then the process 300 may include receiving an approval for the update from a computing device for the corporate account.

At box 314, the process 300 includes updating, by the processor, the project linguistic resources based on the update, which may be in response to receiving the approval.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 4:
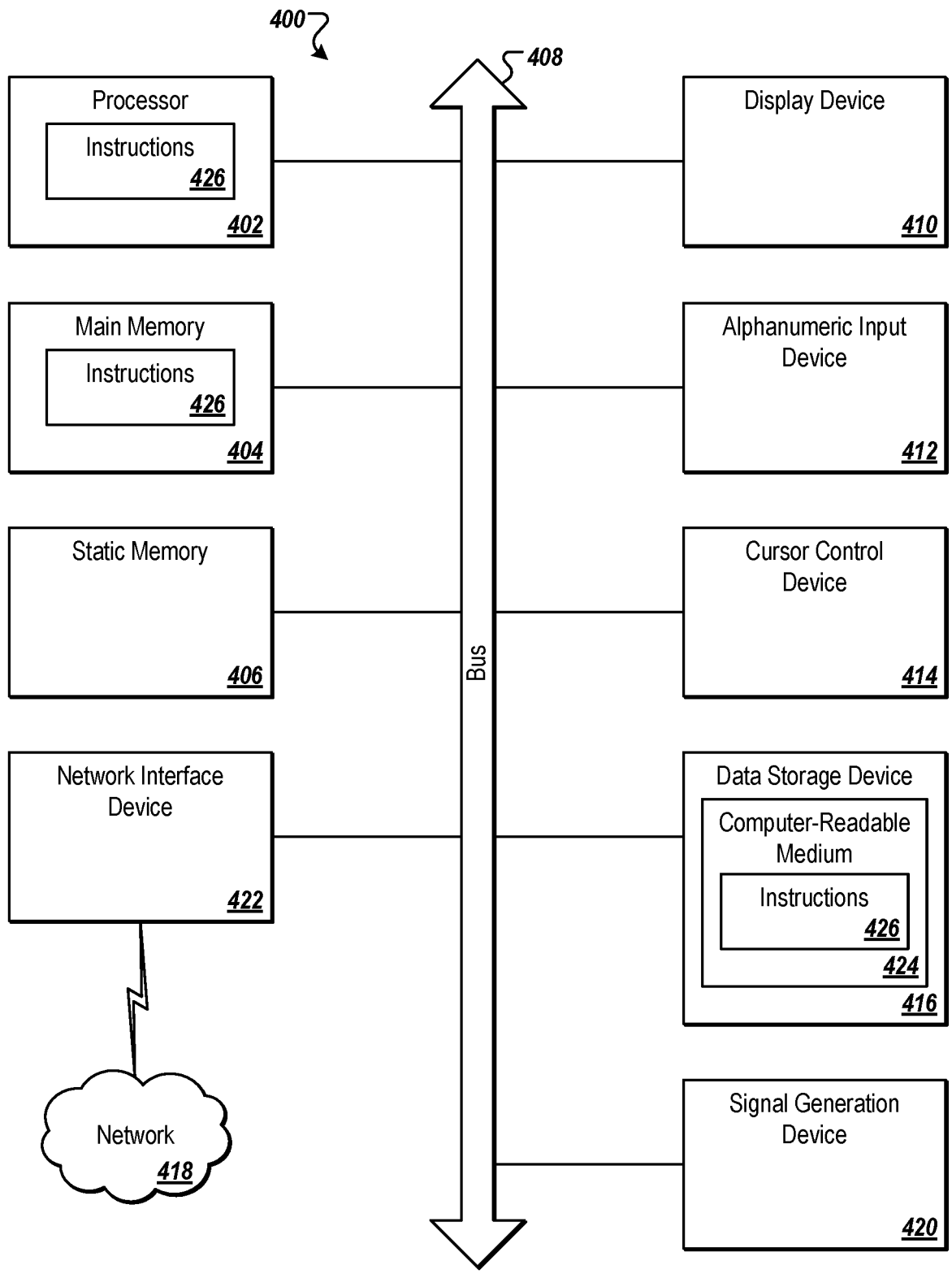
FIG. 4 is a schematic diagram that shows an example of a computing system.

FIG. 4 is a schematic diagram that shows an example of a machine in the form of a computer system 400. The collaborative translation system 102, the translator systems 104a-c, and/or the client system 124 may be implemented using one or more instances of the computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the collaborative translation system 102, such as the GUI module 118, for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the collaborative translation system 102, such as the GUI module 118, embodying any one or more of the methodologies or functions described herein. The sets of instructions 426 of the collaborative translation system 102, such as the GUI module 118, may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The win). "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the teem "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   storing, by at least one processor in a collaborative translation system, one or more first translator linguistic resources for a first personal account of the collaborative translation system and one or more first project linguistic resources for a first corporate account of the collaborative translation system, wherein the first personal account is associated with a user that provides translation services through the collaborative translation system;
   creating, by the processor, a first private profile for the first personal account for the first project account in response to the first personal account being added to a team for the first project account or being assigned to a first translation project for the first project account;
   providing, by the processor, access to a graphical user interface for the first translation project to the first private profile, wherein the first corporate account is associated with a user that administers the first translation project within the collaborative translation system, and wherein the first translation project comprises a first text in at least one first source language to be translated into at least one first target language; and
   receiving, by the processor through the graphical user interface, at least one first translation of at least a portion of the first text from the first source language to the first target language for the first translation project from a computing device for the first private profile, wherein the graphical user interface provides access to the first translator linguistic resources within the first translation project for the first private profile without providing access to the first translator linguistic resources within the first translation project for the first corporate account, and wherein the graphical user interface provides translation suggestions from the first project linguistic resources within the first translation project for the first private profile without providing full access to the first project linguistic resources within the first translation project for the first private profile.

2. The method of claim 1, further comprising copying settings for the creation of the first private profile of the first personal account from a first public profile of the first personal account among a pool of public profiles for freelance translators.

3. The method of claim 1, wherein the first corporate account comprises a vendor account that has been delegated administration of the first translation project by a client account.

4. The method of claim 1, further comprising:
   providing, by the processor, access to the graphical user interface for a second translation project to the first personal account in response to a request from a computing device for a second corporate account of the collaborative translation system, wherein the second corporate account is associated with a user that administers the second translation project within the collaborative translation system, and wherein the second translation project comprises a second text in at least one second source language to be translated into at least one second target language; and
   receiving, by the processor through the graphical user interface, at least one second translation of at least a portion of the second text from the second source language to the second target language for the second translation project from a computing device for the first personal account, wherein the graphical user interface provides access to the first translator linguistic resources within the second translation project for a second private profile of the first personal account without providing access to the first translator linguistic resources within the second translation project for the second corporate account.

5. The method of claim 1, further comprising:
   receiving, by the processor, at least one update to the project linguistic resources from a computing device for the first private profile; and
   updating, by the processor, the project linguistic resources based on the update.

6. The method of claim 5, further comprising receiving an approval for the update from a computing device for the first corporate account, wherein updating the project linguistic resources is in response to receiving the approval.

7. The method of claim 1, wherein the first translator linguistic resources comprise a translation memory, a glossary, one or more regular expressions, or identification of a machine translation engine.

8. The method of claim 7, wherein providing access comprises:
  providing one or more suggestions for translation of the portion in the graphical user interface for the first private profile based on translation of the portion from the translation memory, the glossary, the regular expressions, or the identified machine translation engine;
  receiving at least one selection of the suggestions from the first private profile; and
  adding the selection to the first translation project as a translation for the portion.

9. A system comprising:
  at least one memory that stores instructions; and
  at least one processor configured to execute the instructions to:
    store, in a collaborative translation system, one or more first translator linguistic resources for a first personal account of the collaborative translation system and one or more first project linguistic resources for a first corporate account of the collaborative translation system, wherein the first personal account is associated with a user that provides translation services through the collaborative translation system;
    create a first private profile for the first personal account for the first corporate account in response to the first personal account being added to a team for the first corporate account or being assigned to a first translation project for the first corporate account;
    provide access to a graphical user interface for the first translation project to the first private profile, wherein the first corporate account is associated with a user that administers the first translation project within the collaborative translation system, and wherein the first translation project comprises a first text in at least one first source language to be translated into at least one first target language; and
    receive, through the graphical user interface, at least one first translation of at least a portion of the first text from the first source language to the first target language for the first translation project from a computing device for the first private profile, wherein the graphical user interface provides access to the first translator linguistic resources within the first translation project for the first private profile without providing access to the first translator linguistic resources within the first translation project for the first corporate account, and wherein the graphical user interface provides translation suggestions from the first project linguistic resources within the first translation project for the first private profile without providing full access to the first project linguistic resources within the first translation project for the first private profile.

10. The system of claim 9, wherein the processor is further to execute the instructions to copy settings for the creation of the first private profile of the first personal account from a first public profile of the first personal account among a pool of public profiles for freelance translators.

11. The system of claim 9, wherein the first corporate account comprises a vendor account that has been delegated administration of the first translation project by a client account.

12. The system of claim 9, wherein the processor is further to execute the instructions to:
  provide access to the graphical user interface for a second translation project to the first personal account in response to a request from a computing device for a second corporate account of the collaborative translation system, wherein the second corporate account is associated with a user that administers the second translation project within the collaborative translation system, and wherein the second translation project comprises a second text in at least one second source language to be translated into at least one second target language; and
  receive, through the graphical user interface, at least one second translation of at least a portion of the second text from the second source language to the second target language for the second translation project from a computing device for the first personal account, wherein the graphical user interface provides access to the first translator linguistic resources within the second translation project for a second private profile of the first personal account without providing access to the first translator linguistic resources within the second translation project for the second corporate account.

13. The system of claim 9, wherein the processor is further to execute the instructions to:
  receive at least one update to the project linguistic resources from a computing device for the first private profile; and
  update the project linguistic resources based on the update.

14. The system of claim 13, wherein the processor is further to execute the instructions to receive an approval for the update from a computing device for the first corporate account, wherein updating the project linguistic resources is in response to receiving the approval.

15. The system of claim 9, wherein the first translator linguistic resources and the first project linguistic resources comprise a translation memory, a glossary, one or more regular expressions, or identification of a machine translation engine.

16. The system of claim 15, wherein, to provide access, the processor is further to execute the instructions to:
  provide one or more suggestions for translation of the portion in the graphical user interface for the first private profile based on translation of the portion from the translation memory, the glossary, the regular expressions, or the identified machine translation engine;
  receive at least one selection of the suggestions from the first private profile; and
  add the selection to the first translation project as a translation for the portion.

17. A non-transitory computer-readable medium having instructions stored therein that, when executed by at least one processing device, cause the processing device to:
  store, by the processing device in a collaborative translation system, one or more first translator linguistic resources for a first personal account of the collaborative translation system and one or more first project linguistic resources for a first corporate account of the collaborative translation system, wherein the first personal account is associated with a user that provides translation services through the collaborative translation system;

create, by the processing device, a first private profile for the first personal account for the first corporate account in response to the first personal account being added to a team for the first corporate account or being assigned to a first translation project for the first corporate account;

provide, by the processing device, access to a graphical user interface for the first translation project to the first private profile, wherein the first corporate account is associated with a user that administers the first translation project within the collaborative translation system, and wherein the first translation project comprises a first text in at least one first source language to be translated into at least one first target language; and receive, by the processing device through the graphical user interface, at least one first translation of at least a portion of the first text from the first source language to the first target language for the first translation project from a computing device for the first private profile, wherein the graphical user interface provides access to the first translator linguistic resources within the first translation project for the first private profile without providing access to the first translator linguistic resources within the first translation project for the first corporate account, and wherein the graphical user interface provides translation suggestions from the first project linguistic resources within the first translation project for the first private profile without providing full access to the first project linguistic resources within the first translation project for the first private profile.

18. The computer-readable medium of claim 17, wherein the instructions are further to cause the processing device to copy settings for the creation of the first private profile of the first personal account from a first public profile of the first personal account among a pool of public profiles for freelance translators.

19. The computer-readable medium of claim 17, wherein the first corporate account comprises a vendor account that has been delegated administration of the first translation project by a client account.

20. The computer-readable medium of claim 17, wherein the instructions are further to cause the processing device to:

provide access to the graphical user interface for a second translation project to the first personal account in response to a request from a computing device for a second corporate account of the collaborative translation system, wherein the second corporate account is associated with a user that administers the second translation project within the collaborative translation system, and wherein the second translation project comprises a second text in at least one second source language to be translated into at least one second target language; and receive, through the graphical user interface, at least one second translation of at least a portion of the second text from the second source language to the second target language for the second translation project from a computing device for the first personal account, wherein the graphical user interface provides access to the first translator linguistic resources within the second translation project for a second private profile of the first personal account without providing access to the first translator linguistic resources within the second translation project for the second corporate account.

* * * * *